Jan. 27, 1948. C. L. FELDTKELLER 2,435,072
PUSHER ATTACHMENT FOR CONVEYORS
Original Filed Oct. 16, 1943 2 Sheets-Sheet 1

INVENTOR:
CARL L. FELDTKELLER
BY
Carlsen + Hagle
ATTORNEYS

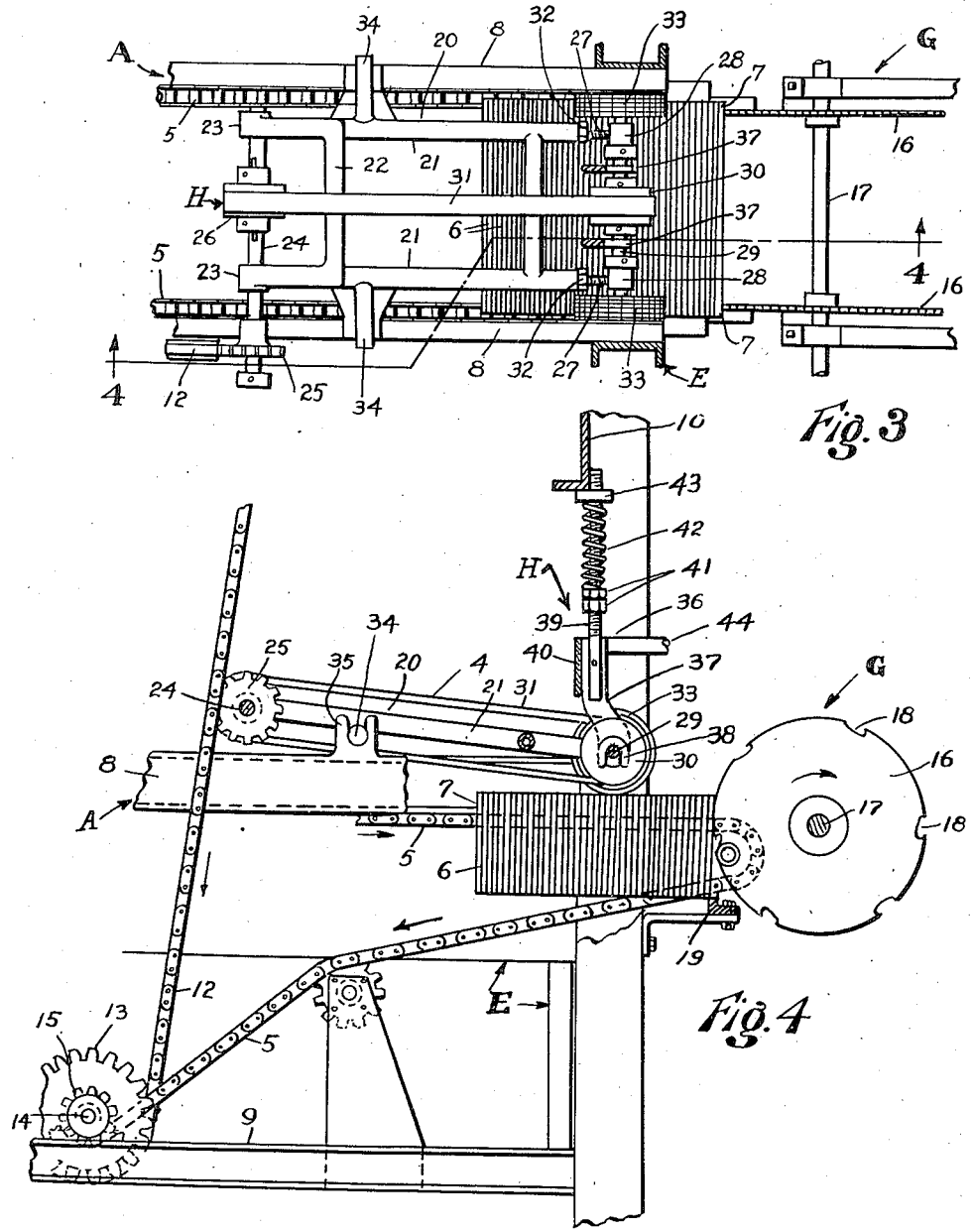

Patented Jan. 27, 1948

2,435,072

UNITED STATES PATENT OFFICE 2,435,072

PUSHER ATTACHMENT FOR CONVEYORS

Carl L. Feldtkeller, Milwaukee, Wis., assignor to Solar Corporation, Milwaukee, Wis., a corporation of Delaware Original application October 16, 1943, Serial No. 506,590. Divided and this application June 19, 1944, Serial No. 541,014

5 Claims. (Cl. 198—35)

This invention relates to the art of making plates for storage batteries and the primary object is to provide a device for facilitating the unloading of curing conveyors used during the manufacturing process. A plurality of such conveyors are employed, having their delivery ends extending in a common direction, and the grid panels from which the plates are made are loaded on these conveyors after pasting, and are then carried through curing chambers in closely spaced relationship to each other while the curing takes place. Following the completion of this curing action, the panels are unloaded by means of a transfer mechanism which removes the panels one at a time and delivers them to a parting mechanism which separates the panels into the individual plates. While suspended on the conveyors the panels are in spaced relation but as they reach the delivery ends in the unloading process they are moved into close contact with each other and against the transfer disks which comprise the main elements of the transfer mechanism, and the end panels are continuously stripped from the conveyor by means of notches in the disks which engage the lugs on the panels.

To insure proper movement of the panels from spaced to close contact position and also efficient stripping of the panels from the conveyors by these disks it is necessary that the panels bear with some pressure on the edges of the disks and so long as the conveyor is comparatively full this pressure is maintained and proper feeding occurs. As the unloading process nears its completion, however, it is found that the comparatively small number of panels which remain do not exert sufficient pressure on the edges of the disks in response to travel movement of the conveyor to insure proper stripping action. Having these facts in mind it is therefore an object of my invention to provide a device which may be placed in operation when required to exert uniform pressure upon the panels as they approach the delivery end of the conveyor to assist in closing them together and to most effectively urge them in the direction of the transfer disks, to insure proper stripping of the last few panels from the conveyor.

The present application is a division of my copending parent application for Apparatus and method for preparing battery plates, Serial No. 506,590, filed October 16, 1943, to which application reference is made for a complete understanding of the entire apparatus in which the present invention is or may be employed.

As disclosed in that application the manufacturing process involves the use of a plurality of curing conveyors which are loaded one at a time with the pasted panels and from any one of which conveyors the panels are removed by a shiftable transfer mechanism as the curing action in the various conveyors is completed. It is a primary object of my present invention to provide a pusher device for use in connection with such an apparatus which is portable or removable so that it may be installed in any one of the curing conveyors which is being unloaded.

In the accompanying drawings which illustrated a preferred embodiment of the invention—

Fig. 3 is an enlarged horizontal sectional view along the line 3—3 in Fig. 2 and showing also a portion of the transfer mechanism.

Fig. 4 is a vertical longitudinal section taken substantially along the line 4—4 in Fig. 3.

Figure 1:
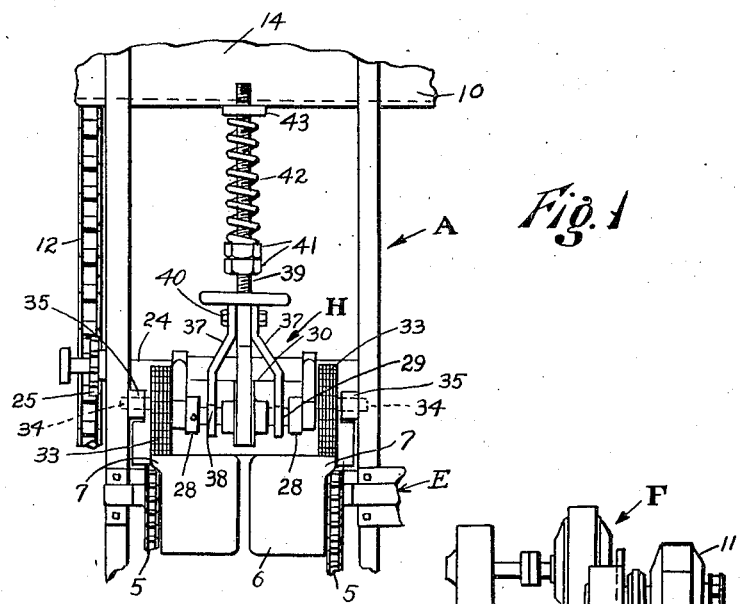
Fig. 1 is a fragmentary end elevation of a curing conveyor showing my pusher attachment in use in connection therewith.

Referring now more particularly and by reference characters to the drawing, A designates generally the curing conveyor structure which, as shown, comprises a plurality of separate conveyors B, C, and D each of which comprises a pair of spaced and endless chains 5 adapted to carry the grid panels 6 by their lugs 7. Panels 6 hang between the chains in suspended positions, as clearly indicated. The conveyor chains are supported in a frame assembly, designated generally at E, which includes longitudinal channels 8 and 9 and adjacent the delivery ends of the conveyors this frame assembly includes an upper cross member 10 whereon is supported a drive mechanism designated generally at F. So far as pertinent to the present invention the drive mechanism F comprises a motor 11 which operates a series of sprocket chains 12 which run downwardly along side delivery ends of the respective conveyors B, C and D, and thence under drive sprockets 13 which are carried upon shafts 14 in turn carrying sprocket gears 15 having driving engagement with lower spans of the conveyor chains 5. The foregoing drive arrangement is such that the upper flights of the chains 5 which carry the panels 6 move to the right as viewed in Figs. 3 and 4 of the drawings, to carry the panels toward the transfer mechanism designated generally at G. Said transfer mechanism comprises a pair of power operated disks 16 supported upon a shaft 17 in spaced relation and adapted to enter between delivery ends of the conveyor chains 5 as seen in Figs. 3 and 4. The margins of the disks 16 have a plurality of notches 18 which are adapted to pick up the panels 6 by their lugs 7 and carry them upwardly and away from the conveyor chains 5, said disks rotating in the direction indicated in Fig. 4 for this purpose.

As disclosed in my co-pending application previously identified, the conveyors B, C, and D are loaded one at a time at their receiving ends (not here shown) with the pasted panels and the loading action continues until each conveyor along its entire length is full of the panels, which are suspended thereon in closely spaced relation. When the conveyors are full they may be stopped to allow the curing action to continue as long as necessary, and then to unload the conveyor, the transfer mechanism G, which is shiftable transversely across the delivery end of the conveyors, is aligned with any selected conveyor and this conveyor is again set in operation. The panels are thus fed toward the transfer disks 16 and, coming to rest against the upwardly moving edges thereof, are stripped one at a time from the conveyor by means of the notches 18.

As the panels reach the proper stripping relation with the transfer disks lower edges of the panels come to rest against a stop designated at 19 in Fig. 4 so that the end panels hang in a vertical position ready for stripping. To insure the proper operation it is obviously necessary that the panels bear with some pressure upon the upwardly moving edges of the transfer disks 16 so that the lugs 7 of the end panels will enter the notches 18 as they register with the lugs. So long as the conveyor contains a substantial sum of the panels the weight and body thereof may be sufficient to maintain this pressure in response to the travel movement of the conveyor chains 5, and as clearly indicated in the drawings, a substantial number of the panels will at such times stand in a closely packed group ready for transferring. However, it is found in practice that for various reasons it is desirable to supplement this pressure resulting from movement of the chains to close the spaces between the panels and to provide a uniform pressure by the plates against the transfer disks under all conditions.

In accordance with my present invention I provide a pusher attachment, designated generally at H, which may be installed in any one of the conveyors B, C or D which is being unloaded, and which operates to urge the panels in the direction of the transfer mechanism G in a manner which will now be described.

This device H comprises a carrier frame, designated generally at 20, having parallel sides 21 and which is narrower than any one of the curing conveyors B, C, or D. At one end the sides 21 of the carrier frame 20 are joined by a yoke 22 having bearings 23 whereon is journaled a shaft 24 having at one extended end a sprocket gear 25. Also mounted on the shaft 24 centrally thereon is a belt pulley 26. At the end of the frame 20 opposite to the yoke 24 the sides 21 are provided with end sockets to slidably receive threaded studs 27 which are rigidly extended from bearings 28 carrying another transverse shaft 29. A belt pulley 30 is mounted centrally upon the shaft 29 and a belt 31 is trained over the pulleys 26 and 30. The belt 31 may be kept taut by screwing up nuts 32 on the studs 27 as will be readily apparent. On the ends of the shaft 29 I mount pressure rollers 33 having roughened peripheral surfaces or treads of resilient material as shown.

Extended from the sides 21 of frame 20 adjacent the yoke 22 are supporting pins or trunnions 34 and to receive the same the upper channels 8 of the conveyor frame assembly E, which run along outer sides of the chains 5 of each conveyor, are provided with transversely aligned notched lugs 35, the notches of which open upwardly as shown in Fig. 4. It will be obvious that the pusher device H may thus be placed over any one of the conveyors B, C or D by engaging the trunnions 34 with the proper lugs 35 and the parts are so arranged that when thus positioned the pressure rollers 33 will ride the upper edges of the panels 6 accumulated in that conveyor. In such position of pusher H the sprocket gear 25 will also be brought into meshing relation with the downwardly moving side of the sprocket chain 12 driving that conveyor, and the shaft 24 will thus be rotated by chain 12, causing the belt 31 to rotate the shaft 29, and rotating the pressure rollers 33 in a counterclockwise direction as viewed in Fig. 4. In other words, the lower sides of the pressure rollers 33 run in contact with upper edges of the grid panels 6 in the direction of the delivery ends of the conveyors.

It may here be noted that since the sprocket gear 13, which is driven by the drive chain 12, is substantially larger in diameter than the pinion 15 which actuates the conveyor chains, and since sprocket pinion 25, also driven by chain 12, is approximately the same diameter as pulley 26, the belt 31 and rollers 33 will travel at a considerably faster peripheral speed than will the conveyor chains 5; and because of that fact the rollers 33 will continuously urge the plates 6 toward the transfer disks 16, thus closing the plates against each other and giving them the desired pressure contact against the disk edges.

The frame 20 is obviously swingably supported with respect to the grid panels and is urged downwardly at the end carrying the pressure rollers 33 by means of a pressure head designated generally at 36. This pressure head 36 has spaced legs 37 with downwardly opening notches 38 in lower ends adapted to straddle the shaft 29 and opposite sides of the pulley 30, and between the upper ends of the legs 37 a threaded toggle pin 39 is pivoted by transversely extending bolt 40. Above this pivot 40 the toggle pin 39 carries a pair of lock nuts 41 against which is braced the lower end of an expansion coil spring 42. A stop or washer 43 is placed upon the pin 39 above the spring 42. Extending from the upper ends of the legs 37 is a handle loop 44.

Figure 2:
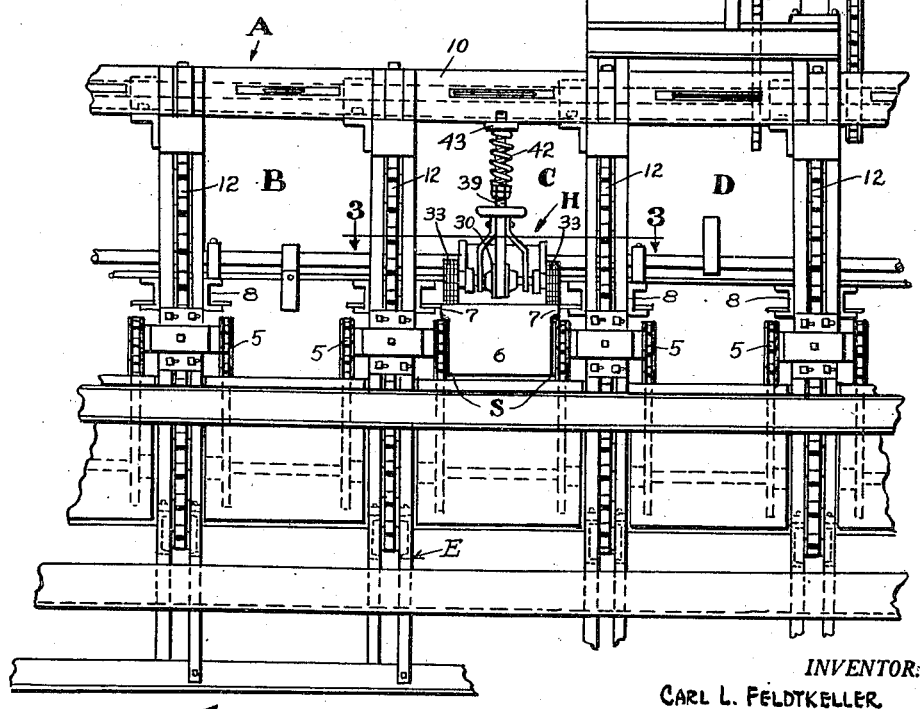
Fig. 2 is a similar end view showing a plurality of curing conveyors and my pusher attachment operatively arranged in connection with one of such conveyors and further illustrating the conveyor drive mechanism.

In use the pusher device H is positioned in the conveyor being unloaded as previously described and the stop 43 is hooked or brought to rest under the lower edge of the upper frame channel 10 as seen in Figs. 1, 2, and 4. The spring 42 is thus compressed and exerts a yieldable downward force upon the adjacent end of the frame 20, urging the rollers 33 into forcible or pressure engagement with upper edges of the grid panels. The pressure thus exerted by the spring 42 is adjustable by means of the nuts 41 and this pressure will also hold the toggle pin 39 upright as shown in Fig. 4, so long as the device is in operation. When it is desired to remove the device from the conveyor the handle loop 44 is grasped and pulled outwardly causing the toggle pin 39 and legs 37 to buckle or act as a toggle about the pivot 40 removing the pressure of the spring 42 and permitting the entire pusher structure to be readily lifted out over the transfer device G or from the delivery end of the conveyor.

It will be apparent that the rotation of the rollers 33 will have a tendency to urge the grid panels 6 toward the delivery end of the conveyor over which the pusher is used and will urge even the last very few of such panels upwardly against the disks 16, thus resulting in the maintenance of a uniform pressure between the panels and the disks. The pusher may be installed in the conveyor only as it approaches the completion of the unloading operation or may be used throughout the operation if desired.

It is understood that suitable modifications may be made in the construction and details of the machine, as thus described, without departing from the spirit and scope of the appended claims. Having now therefore fully disclosed my invention, what I claim to be new and desire to protect by Letters Patent is:

1. The combination with a plurality of conveyors having delivery ends, a frame assembly supporting the conveyors, and transfer means for removing articles from the delivery ends of the conveyors, of a device including a carrier frame adapted to be removably mounted on the conveyor frame assembly and positionable over any one of the conveyors, a power driven roller carried by the carrier frame adapted to rotate in contact with articles traveling along the conveyor over which the carrier frame is positioned and to urge said articles toward and into operative relationship with the transfer means, the said carrier frame including trunnions, the conveyor frame assembly having notches to receive said trunnions to swingably support the carrier frame over any selected conveyor, and a pressure device carried by the carrier frame for releasable engagement with the conveyor frame assembly and operative to yieldably urge the roller in a downward direction.

2. The combination with a plurality of conveyors, drive means therefore, and transfer means for removing articles from delivery ends of the conveyors, of a pusher device comprising a frame adapted to be removably positioned over any selected conveyor, a roller on the frame adapted to roll in contact with articles on the selected conveyor and urge said articles into operative relationship with the transfer means, and drive mechanism for the roller including a driving element adapted to establish driving connection with the drive means for the selected conveyor as the frame is positioned thereover.

3. The combination with a conveyor for carrying articles and a frame for the conveyor, of a device including a carrier frame swingably supported adjacent one end on the conveyor frame for up and down movements at its opposite end toward and away from the articles carried in the conveyor, a power driven roller on said swingable end of the carrier frame adapted to turn in contact with upper parts of the articles, and a toggle mechanism including a spring operatively arranged between the conveyor frame and swinging end of the carrier frame for downwardly urging the roller into pressure engagement with the articles.

4. In combination with a frame having a grid panel conveyor mounted therein, and a transfer device at the discharge end of the conveyor, of a pusher device for engaging the panels on the conveyor and urging them toward the transfer device, said pusher device comprising a power driven roller mounted for frictional engagement with panels on the conveyor, a movable member mounting the roller, and a spring actuated toggle device for controlling the pressure of the roller on the panels.

5. In combination with a frame having a grid panel conveyor mounted therein, and a transfer device at the discharge end of the conveyor, of a pusher device for engaging the panels on the conveyor and urging them toward the transfer device, said pusher device comprising a power driven roller mounted for frictional engagement with panels on the conveyor, a movable member mounting the roller, and a spring actuated toggle device for controlling the pressure of the roller on the panels, said toggle device having connection with the conveyor supporting frame.

CARL L. FELDTKELLER.

REFERENCES CITED

The following references are of record in the file of this patent:

UNITED STATES PATENTS

| Number | Name | Date |
|---|---|---|
| 1,106,272 | Ayres | Aug. 4, 1914 |
| 1,107,623 | Leatherbee | Aug. 18, 1914 |
| 1,141,501 | Stock | June 1, 1915 |
| 1,388,668 | Schumacher | Aug. 23, 1921 |
| 1,590,611 | Wright et al. | June 29, 1926 |
| 1,824,414 | Stein | Sept. 22, 1931 |
| 1,915,402 | Carleton et al. | June 27, 1933 |
| 2,081,944 | Lund | June 1, 1937 |
| 2,135,806 | Fermann et al. | Nov. 8, 1938 |
| 2,195,723 | Feldtkeller et al. | Apr. 2, 1940 |
| 2,301,088 | Stahl | Nov. 3, 1942 |
| 2,354,264 | Hitchcock | July 25, 1944 |

FOREIGN PATENTS

| Number | Country | Date |
|---|---|---|
| 565,224 | Germany | Nov. 28, 1932 |